US009511312B2

United States Patent
Spenger et al.

(10) Patent No.: US 9,511,312 B2
(45) Date of Patent: Dec. 6, 2016

(54) SIEVE DRUM AND INSTALLATION EQUIPPED WITH IT FOR REMOVING MATERIALS TO BE SIEVED FROM A LIQUID

(71) Applicant: Huber SE, Berching (DE)

(72) Inventors: Franz Spenger, Röttenbach (DE); Reinhard Stiegler, Berching (DE); Daniel Hummel, Berching (DE); Michael Kink, Neumarkt (DE)

(73) Assignee: Huber SE, Berching (DE)

( * ) Notice: Subject to any disclaimer, the term of this patent is extended or adjusted under 35 U.S.C. 154(b) by 0 days.

(21) Appl. No.: 14/700,806

(22) Filed: Apr. 30, 2015

(65) Prior Publication Data
US 2015/0314222 A1    Nov. 5, 2015

(30) Foreign Application Priority Data
Apr. 30, 2014    (DE) ........................ 10 2014 106 079

(51) Int. Cl.
| | | |
|---|---|---|
| *B01D 33/11* | (2006.01) | |
| *E03F 5/14* | (2006.01) | |
| *B01D 33/50* | (2006.01) | |
| *B01D 33/76* | (2006.01) | |
| *E02B 8/02* | (2006.01) | |

(52) U.S. Cl.
CPC .............. *B01D 33/11* (2013.01); *B01D 33/50* (2013.01); *B01D 33/76* (2013.01); *E03F 5/14* (2013.01); *E02B 8/023* (2013.01)

(58) Field of Classification Search
CPC ......... B01D 33/11; B01D 33/50; B01D 33/76; E02B 8/023; E03F 5/14
See application file for complete search history.

(56) References Cited

U.S. PATENT DOCUMENTS

| | | | |
|---|---|---|---|
| 3,486,626 A | 12/1969 | Close | |
| 4,634,524 A | 1/1987 | Huber | |
| 4,954,249 A * | 9/1990 | Gero | ........................ D21D 5/16 209/273 |
| 2012/0073676 A1 | 3/2012 | Frommann et al. | |

FOREIGN PATENT DOCUMENTS

| | | |
|---|---|---|
| DE | 34 20 157 C1 | 1/1986 |
| DE | 41 36 401 A1 | 1/1993 |
| DE | 94 21 793 U1 | 9/1996 |
| DE | 10 2010 041312 A1 | 3/2012 |
| EP | 2 433 692 A1 | 3/2012 |

OTHER PUBLICATIONS

EP Search Report, Oct. 23, 2015.
German Search Report, Feb. 19, 2015.

* cited by examiner

*Primary Examiner* — Thomas M Lithgow
(74) *Attorney, Agent, or Firm* — Dority & Manning, P.A.

(57) ABSTRACT

The invention refers to a sieve drum for an installation to remove material to be sieved from a liquid, especially sewage (1), in which case the sieve drum (4) has an opening (6) at least in a front side area (5), through which it can be refilled with a liquid that carries the material to be sieved. According to the invention, it is suggested that the sieve drum (4) should comprise a folded sieve wall (9) with many openings (6), in which case the sieve drum (4) has a support structure that fixes the sieve wall (9) exclusively in a clamping way. In addition, an installation to remove material to be sieved from a liquid, especially sewage (1), with a corresponding sieve drum is described.

12 Claims, 5 Drawing Sheets

SIEVE DRUM AND INSTALLATION EQUIPPED WITH IT FOR REMOVING MATERIALS TO BE SIEVED FROM A LIQUID

FIELD OF THE INVENTION

The present invention refers to a sieve drum for an installation to remove material to be sieved from a liquid, especially sewage, in which case the sieve drum has an opening at least in a front side area, so it can be refilled with a liquid that carries the material to be sieved.

BACKGROUND

Furthermore, an installation to remove materials to be sieved from a liquid, especially sewage, is suggested, in which case the installation comprises a sieve drum at least partially immersed in the liquid that can be moved around a rotating axis with the help of a drive while the device is being operated that has an opening at least in the front side area so it can be refilled with the liquid that carries the material to be sieved, and in which case the installation has at least one discharge mechanism partially arranged inside the sieve drum for the material to be sieved, preferably in form of a screw conveyor or suction device, in which case the discharge mechanism has a supply area inside the sieve drum in form of a collecting funnel, for example, for the material to be sieved.

Such a corresponding installation is known, for example, from DE 34 20 157 C1. The installation described therein has a sieve drum shaped like a cylindrical shell placed obliquely in a sewer that is hydraulically open on the inflow side (i.e. in opposite flowing direction of the sewage flowing into the sewer) and is largely hydraulically closed on the outflow side. The sieve drum has, for example, slots that form a separation surface on the inner side for the material to be sieved that is carried by the sewage, in which case the liquid passes through the slots and thus stays in the sewer. Finally, the sieve drum is driven in a rotating manner together with a screw conveyor protruding partially into the sieve drum, in which case the screw conveyor begins in the area of a collecting funnel for the material to be sieved that is arranged inside the sieve drum. Above the collecting funnel, in the outer side area of the sieve drum, a removal mechanism arranged immovably in form of a brush roller or spray water bar is provided to remove the material to be sieved adhering to it from the outside. Finally, the material to be sieved falls into the collecting funnel, from which it can be transported by the screw conveyor (installed subsequently) to a dropping place located outside the sewer.

Generally, in connection with the above-mentioned sieve drum, it is customary to weld the sieve plates that form the sieve wall together or with a sieve drum support structure to give it the necessary stability. However, the heat generated by the welding process can produce localized sieve drum unbalances that in the later operation of the installation could lead to increased wear when the sieve drum is rotated.

SUMMARY OF THE INVENTION

A task of the present invention is therefore to suggest a generic sieve drum and an installation equipped with it to remove the material to be sieved from a liquid, characterized by a simple yet precise construction. Additional objects and advantages of the invention will be set forth in part in the following description, or may be obvious from the description, or may be learned through practice of the invention.

The tasks are solved by a sieve drum and an installation to remove material to be sieved from a liquid that has the characteristics as described herein.

According to the invention, the sieve drum (which should essentially have a basic cylindrical shape) is thus characterized by having a folded sieve wall with many sieve openings. Compared to conventional sieve drums (which have a smooth sieve wall), the folded sieve wall has a much higher active sieve surface with the same sieve drum diameter. Another advantage of the folding is that the material to be sieved that is held back in the interior depressions created by the folding accumulates, and can be conveyed upwards as long as the operating sieve drum is moved around a horizontal or inclined rotating axis. Last but not least, the folding of the sieve surface imparts a higher stability to the sieve drum that extends its useful life.

The invention also provides a support structure for the sieve drum that fixes the sieve wall exclusively by clamping it in place. The sieve wall consists of one or several folded sieve plates that have, for example, many sieve openings shaped like bore holes or slots so the liquid to be sieved can flow through. The sieve wall or its individual sieve plates are then clamped only by the support structure or its components that will be described in more detail below. Thus, as opposed to the state of the art, a welding together of support structure and sieve wall is no longer provided, so that the sieve drum unbalances caused by manufacturing are almost entirely ruled out.

The clamping is preferably so strong here that a relative movement between support structure and sieve wall is possible only by the exertion of force, which does not occur during the normal operation of the sieve drum in the installation described in more detail below. Ultimately, support structure and sieve wall are therefore basically joined together rigidly, even if their joining is accomplished exclusively by the clamping elements exerting their force on the sieve wall.

Incidentally, the clamping takes place preferably in the area of at least one section of the sieve wall's outer edges or its individual elements (i.e. the individual sieve plates from which the sieve wall is ultimately made up of). For example, it could be conceivable for the sieve wall to consist of several ring elements that in each case have a basic cylindrical shell structure that, in turn, are fixed in place by the clamping support structure in the area of the outer edges running in circumferential direction. In addition, the support structure can generally comprise one or several support rings and the connecting elements that join the support rings (e.g. in form of connecting rods joined to the support rings) in the direction of the sieve drum's rotating axis.

It is likewise advantageous if the sieve wall is folded in zigzag, wavy or cascading fashion, preferably in a cross section running perpendicularly to the rotating axis, so that sieve wall depressions alternate with sieve wall elevations. Preferably, the sieve wall follows the form of a cylindrical shell in principle, in which case the distance between adjacent sieve wall elevations and sieve wall depressions is many times smaller than the sieve drum diameter. It is additionally advantageous if the folding runs uniformly over the perimeter of the sieve drum.

It is additionally advantageous if the sieve wall depressions and the sieve wall elevations run parallel or skew to the sieve drum's rotating axis. If the built-in sieve drum's rotating axis is horizontally or obliquely aligned to it, then a parallel alignment of the sieve wall depressions and elevations, in particular, is advantageous. In this case, the material to be sieved that is held back by the sieve wall is transported upward when the sieve drum is turned and can finally fall into a discharge mechanism protruding into the sieve drum—for example, a screw conveyor or the entrance to a suction device—for removal from the sieve drum. Alternately to this, the discharge mechanism can also have an outlet for the material to be sieved.

It is additionally advantageous if the support structure comprises one or several support rings, in which case the corresponding support rings are surrounded in such a way by the sieve wall that the sieve wall depressions abut on the support rings in circumferential direction of the sieve drum and are thus held in place by the corresponding clamping force. Here, the support ring(s) support(s) the sieve wall from the interior, thereby forming a contact surface for the sieve wall or its sieve wall depressions, in which case the sieve wall is pressed against the support ring(s) and is therefore fixed in place with the help of clamping elements (in the form of the clamping rings, for example, named in the following paragraph).

The clamping rings are arranged preferably next to one another in the direction of the rotating axis and run concentrically to each another. In particular, one support ring can in each case be arranged in the area of the two front sides of the sieve drum. Apart from that, one or several support rings can be placed between the two front sides to increase the stability of the sieve drum (in which case the support rings can have, for example, a width running in the direction of the rotating axis ranging from 2 to 8 cm). Finally, the mutual distances between the individual support rings should be roughly equal. Furthermore, to use the sieve drum in connection with sewage treatment, it makes sense for the sieve drum or its support rings to have a diameter that exceeds one meter, but it can also exceed two meters if necessary. In any case, the support rings can be made from metal and joined with connecting elements (e.g. in form of connecting rods running parallel to the rotating axis) preferably in the direction of the rotating axis of the sieve drum, in which case the connecting elements and the support rings can be joined together in a force-fitted, form-fitted and/or firmly bonded way.

It is additionally advantageous if the support structure comprises one or several clamping rings and the respective clamping ring surrounds the sieve wall in such a way that it abuts on the sieve wall elevations in the circumferential direction of the sieve drum. Thus, the clamping ring(s) surround(s) the sieve wall in its external side area and press it preferably against the above-mentioned support ring(s). In other words, it is advantageous if one support ring and one clamping ring create a ring gap between the two of them in which finally at least one outer edge of the sieve wall running in circumferential direction of the sieve drum can engage. This outer edge is pressed here between support ring and clamping ring and fixed in place as a result of this. In a section running perpendicularly to the rotating axis, the sieve wall runs in this case between the corresponding support and clamping rings, and the support ring(s) is/are surrounded by the sieve wall and the sieve wall by the clamping ring(s).

It is furthermore advantageous if one support ring and one clamping ring are arranged in a joint plane running perpendicularly to the rotating axis. The clamping forces acting on the sieve wall from outside (through the clamping rings) and inside (through the support rings) run in this case likewise on a plane, to prevent unwanted sieve wall deformations. Apart from that, it can be advantageous if the thickness of the support rings running perpendicularly to the rotating axis is larger than the thickness of the clamping rings, since the support rings mentioned first take over the supporting function of the sieve drum (at least partially) and are thus exposed to a higher strain.

It is particularly advantageous if the sieve wall is clamped under a pre-stress between the corresponding support and clamping rings. Through this, a relative movement between sieve wall and support or clamping rings can be prevented most effectively, so that additional immobilizations can be dispensed with. In this case, the folds of the sieve walls are slightly squeezed together in radial direction regarding the rotating axis with respect to the form that the folds had before being clamped by the clamping rings.

It is additionally advantageous if the sieve wall comprises several individual elements arranged next to one another in the direction of the sieve drum's rotating axis. These individual elements can be individual sieve wall rings that are arranged contiguously with respect to one another in the direction of the rotating axis. It is also conceivable for the sieve wall or the above-mentioned sieve wall rings to consist of individual elements to be joined (preferably welded together) in the circumferential direction of the sieve drum. (Alternately, a corresponding joining together could also be dispensed with, so that the respective individual elements are held exclusively by the clamping on the support structure and are aligned towards one another as a result of this.) Moreover, it is advantageous if at least two of the individual elements arranged next to one another in the direction of the rotating axis are separated from each another by one or several crosspieces running in circumferential direction of the sieve drum. The crosspieces strengthen the support structure of the sieve drum. In addition, it is possible to join together one support ring with one clamping ring with the help of a crosspiece.

It is especially advantageous if at least a few support rings and/or at least a few of the clamping rings are joined with one or several of the crosspieces in a firmly bonded way. For example, it could be conceivable to weld together one crosspiece with one support ring and/or one clamping ring. Here, the joining of crosspiece and support ring or crosspiece and clamping ring can take place in circumferential direction of the sieve drum only in sections. Generally, however, it is advantageous if one clamping ring with one support ring and the crosspiece running in between in a section running parallel to the rotating axis has a double T-structure.

It is also an advantage if at least two of the sieve wall's individual elements make contact with a joint support ring and/or a joint clamping ring. In particular, it is advantageous in this context if at least one support ring and one clamping ring with the crosspiece connecting them together create one or two opposite ring grooves with respect to the crosspiece that finally serve as seats for the outer edges of the corresponding individual elements of the sieve wall. While one ring groove is an advantage when the corresponding crosspiece is placed in the area of one front side of the sieve drum, two ring grooves are advantageous when the crosspiece is located between two contiguous individual elements of the sieve wall that have the form of a cylindrical shell. Here, the respective crosspiece—preferably ring-shaped and running concentrically to the support and clamping ring—represents an interruption of the sieve surface formed by the sieve wall because it separates the individual elements—especially cylindrical shell-shaped—of the sieve wall from one another in the direction of the rotating axis. Naturally, it is also conceivable for the sieve wall to consist of several cylinder shell-shaped wall sections that, in turn, consist of the corresponding individual elements (in which case the individual elements can be provided as individual ring sections, in which case several ring sections can create one of the above-mentioned cylindrical shell-shaped wall sections in a built-in (i.e. clamped) state).

Special advantages are conferred if the sieve drum comprises one or several tension rings (which surround the sieve wall in its outer side area) equally spaced from one another in the direction of the rotating axis. The tension rings serve to increase the stability of the sieve drum and can be provided in form of flat steel rings. It is furthermore conceivable for the tension rings to abut so tightly to the sieve wall or its sieve wall elevations that no additional fixation to the sieve wall is necessary. Thus, the tension rings are held in their intended position only through friction forces.

It is advantageous if the tension rings are arranged between the support rings and/or between the clamping rings in the direction of the sieve drum's rotating axis to stabilize the sieve surface area existing between the above-mentioned rings. Moreover, more than one tension ring is preferably placed between two contiguous support or clamping rings. For example, it would be a good idea if the distances separating the contiguous tension rings correspond more or less to the distance between one tension ring and a contiguous clamping ring.

Finally, the installation according to the invention to remove material to be sieved from a liquid has a sieve drum according to the description given above or below, in which case the sieve drum's characteristics already described can be implemented singly or in any combination, as long as no contradictions are created when doing so and the sieve drum has a folded sieve wall with many sieve openings and a support structure that serves exclusively to clamp the sieve wall in place. In addition, the installation comprises a drive for the sieve drum so it can be rotated around its rotating axis in order to transport the material to be sieved that is held back upwards. There, gravity removes the material to be sieved, especially assisted by a bristle and/or spray nozzle bar located outside of the sieve drum, from the inner surface of the sieve wall and falls into the above-mentioned discharge mechanism, which transports the material to be sieved, possibly with residual quantities of the liquid to be sieved, out of the installation, in which case the liquid can pass through the sieve drum.

In particular, the installation finally serves to remove the material to be sieved from sewage flowing into a sewer, the sieve drum in this case being aligned preferably obliquely with respect to the horizontal, so that the sewage can flow into it through the opening in the area of a front side of the sieve drum and can finally be freed of the material to be sieved.

BRIEF DESCRIPTION OF THE DRAWINGS

Additional advantages of the invention are described in the embodiments given below, which show schematically.

DETAILED DESCRIPTION

Figure 1:
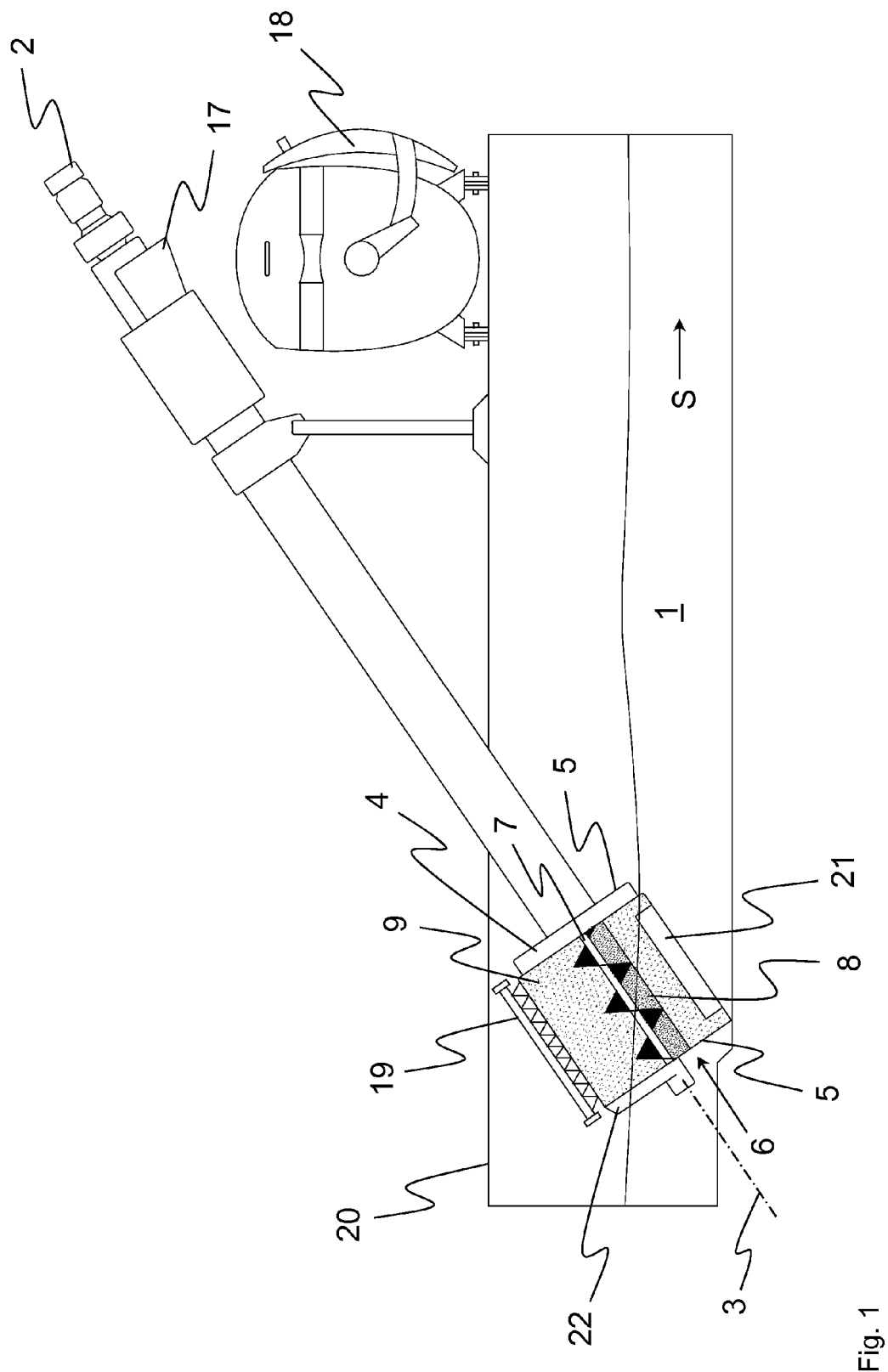
FIG. 1 an installation to remove material to be sieved from flowing sewage.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a part of a sewer 20, in which sewage 1 contaminated with material to be sieved (not shown explicitly) flows in a given direction of flow S with a mostly varying water level. The installation arranged therein to remove the material to be sieved has a sieve drum 4, whose rotating axis 3 is inclined towards the horizontal and extends preferably all the way to the floor of the sewer 20 (or just above it), in which case a sealing can be provided (not shown) between the sewer 20 and the sieve drum 4, so that the contaminated sewage 1 cannot pass the installation on the side of the sieve drum 4.

The sieve drum 4 has a sieve wall 9 with a largely cylindrical shell-shaped basic shape that consists, for example, of a perforated or slotted metal plate. Furthermore, on the inflow side, the sieve drum 4 has a front side 5 provided with an opening 6 through which the contaminated sewage 1 can flow into the interior of the sieve drum 4. On the other hand, a sealed—and therefore hydraulically closed—front side 5 can be provided on the outflow side.

While the installation is operating, a rotational movement around its rotating axis 3 is imparted to the sieve drum 4 with the help of a drive 2. In this case, the material to be sieved that is held back by the sieve wall 9 is transported upward and to facilitate the transportation of the material to be sieved, the sieve drum 4 can be provided with individual carrier bars 21.

Finally, a spray nozzle bar 19 is arranged in the upper area to remove the adhered material to be sieved so it can fall into a feeding area 8 designed as a collection funnel, for example, and from there into the area of a discharge mechanism 7 that can have the form of a screw conveyor (needless to say, instead of or in addition to the spray nozzle bar 19, air nozzles, scrapers or brush elements can also be provided).

The discharge mechanism 7 reaches finally all the way to a discharge 17 area in the upper section of the installation, so the material to be sieved is transported upward and can finally be disposed via the discharge 17 into a container 18.

The impulse of the drive 2 of the discharge mechanism 7 is generally discontinuous so standstill and movement times (when the sieve drum 4 is turned) alternate. Finally, so the rotational movement of the drive 2 can be transferred to the sieve drum 4, a drive arm 22 can be provided in the lower end of the worm shaft for interconnecting the worm shaft of the discharge mechanism 7 with the sieve drum 4.

Alternately to the installation shown in FIG. 1, the sieve drum 4 according to the invention can naturally also be used in other installations that serve to remove material to be sieved from a liquid. Thus, the sieve drum 4 can be used, for example, in installations that have a suction or run-off device instead of a screw conveyor (which most of the time cannot reliably transport very fine material to be sieved to the exterior). The sieve drum 4 rotates here also through a driving axle that is, in turn, connected to a drive 2. The material to be sieved, which in such installations also collects on the rotating interior surface of the sieve wall 9, is removed, in turn, with the help of a spray nozzle bar 19, for example, from the sieve wall 9 to reach finally a trough-like collecting device, for example, in the interior of the sieve drum 4. The material to be sieved and the spray water finally form a suspension that is suctioned by the suction device of the discharge mechanism 7 so it can be transported further (alternately, a run-off device can be provided through which the suspension can flow out of the sieve drum 4 owing to gravity). Here, the collecting device can have a U-shape or semicircular cross section, for example, and is generally arranged in the area of the rotating axis 3 of the sieve drum 4.

In any case, the sieve wall 9 is designed to have folds in zigzag, wavy or cascading fashion, so that sieve wall depressions 10 alternate with sieve wall elevations 11. The corresponding embodiment of such a sieve wall 9 is shown exemplarily in FIG. 2, where sieve wall depressions 10 and sieve wall elevations 11 run parallel to the rotating axis 3 of the sieve drum 4. In the case shown here, the cylindrical shell shape of the sieve wall 9 is held with the help of support rings 23 arranged in the area of the front sides 5, in which case an additional support ring 23 runs between the above-mentioned front sides 5 and the support rings 23 are welded to the sieve wall 9.

Figure 2:
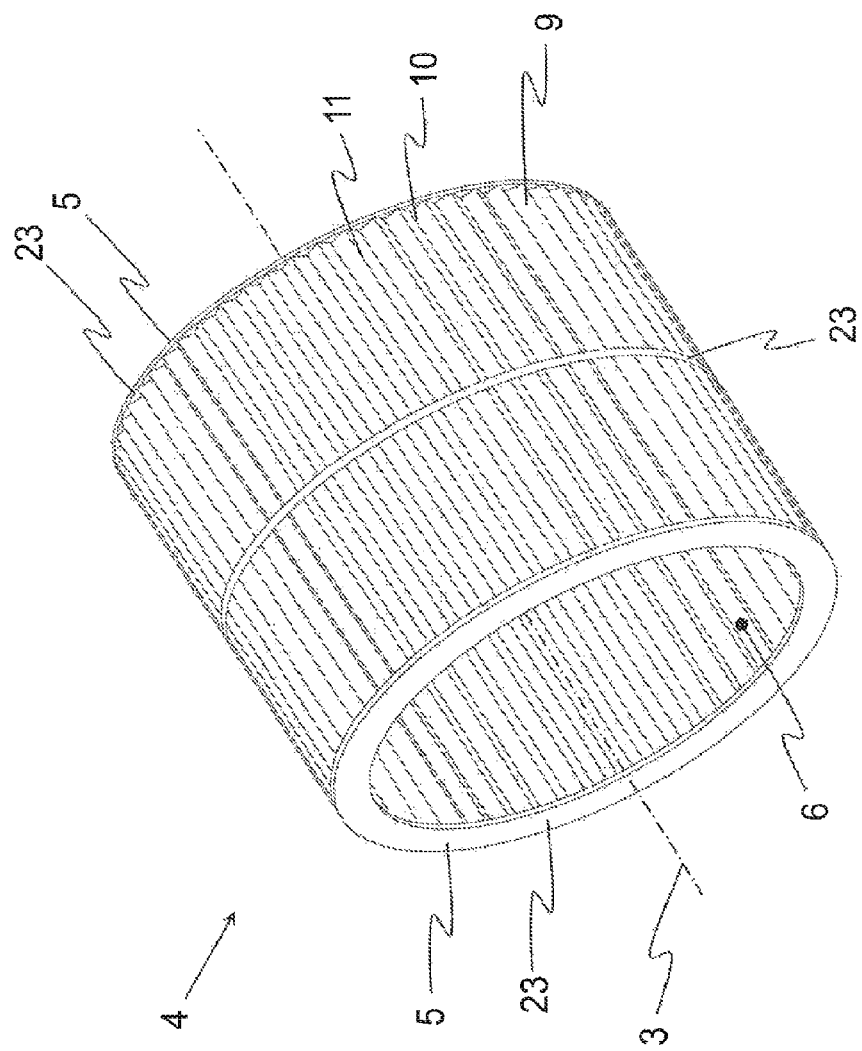
FIG. 2 a sieve drum for an installation to remove material to be sieved from a liquid, FIG. 3 a section of a cross-section running perpendicularly to the rotating axis of a sieve drum according to the invention, FIG. 4 a section of a longitudinal section running parallel to the rotating axis of a sieve drum according to the invention, and FIG. 5 a section of a longitudinal section running parallel to the rotating axis of a sieve drum according to the invention in the area of one of its front sides.

The sieve drum 4 according to the invention differs mainly from the variant shown in FIG. 2 in that the sieve wall 9 is fixed on this support structure.

Figure 3:
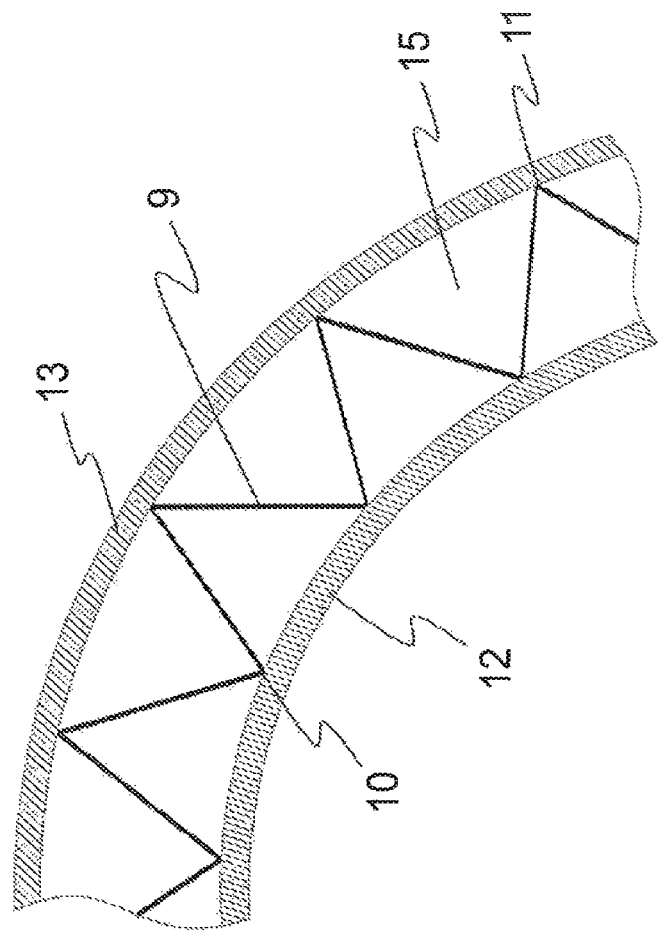
Figure 4:
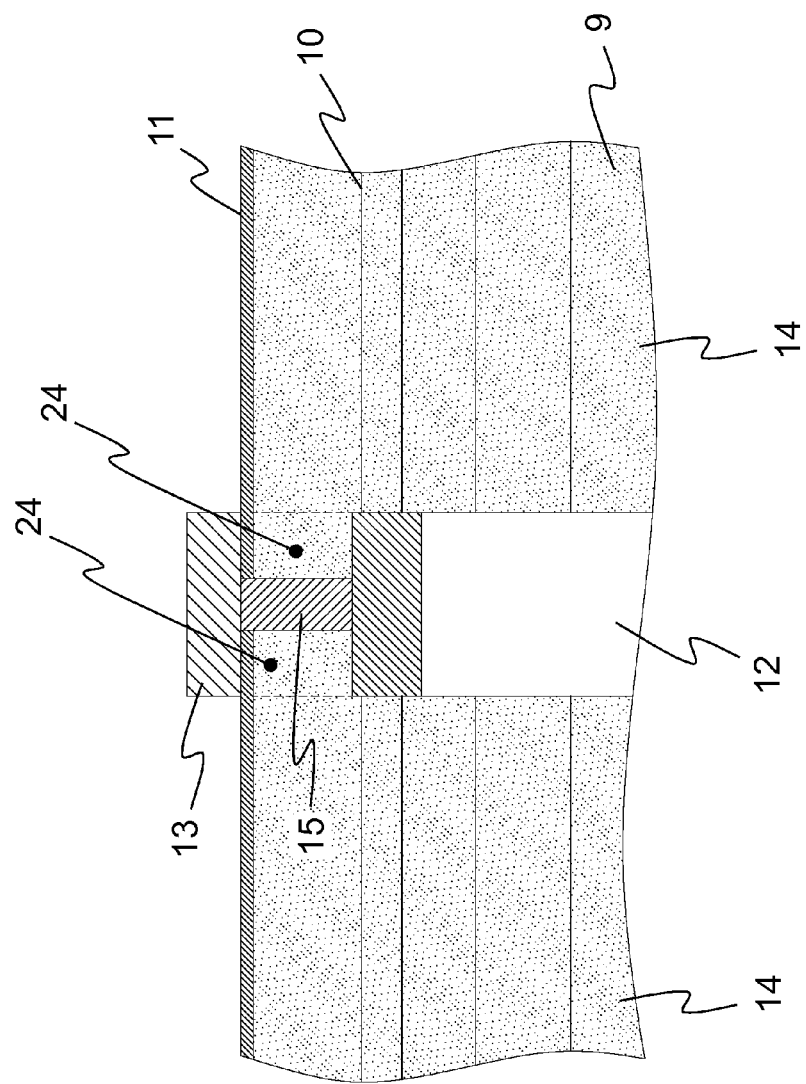

As the overall view of FIG. 3 (section of a cross section of a sieve drum 4 according to the invention running perpendicularly to the rotating axis 3) and 4 (section of a longitudinal cut of a sieve drum 4 according to the invention running parallel to the rotating axis 3) shows in this context, the sieve wall 9 abuts with its inner side (i.e. through its sieve wall depressions 10) to one or several support rings 12 (arranged next to one another in the direction of the rotating axis 3 and running in circumferential direction of the sieve drum 4), which can be formed in each case by a metal ring, for example. As can be seen in FIG. 4, at least one support ring 12 can be placed between two contiguous individual elements 14 of the sieve wall 9 so the circumferential outer edges of the sieve wall 9 lie on the support ring 12 shown through the sieve wall depressions 10. Needless to say, additional corresponding support rings 12, which subdivide the sieve wall 9 in correspondingly numerous individual elements, can follow in the direction of the rotating axis 3.

A crosspiece 15 (which also has an annular design and lies on the support ring 12 in circumferential direction) runs between the individual elements 14 shown and is connected to the support ring 12 by being welded to it, for example. While the support ring 12 and crosspiece 15 are shown as two separate parts in the embodiment shown, it is naturally possible to design support ring 12 and crosspiece 15 as a single piece.

Finally, one clamping ring 13 (which can likewise be available as metal ring or metal band) is provided for each support ring 12, and is in turn, connected to the crosspiece 15, preferably welded. Ultimately, two circumferential ring grooves 24 are formed by the support ring 12, the crosspiece 15 and the clamping ring 13 in the circumferential direction of the sieve drum 4, and one individual element 14 of the sieve wall 9 extends in each case into them to be clamped in place (the individual elements 14, in turn, can consist of individual sections, for example, of two semi-circular rings).

Figure 5:
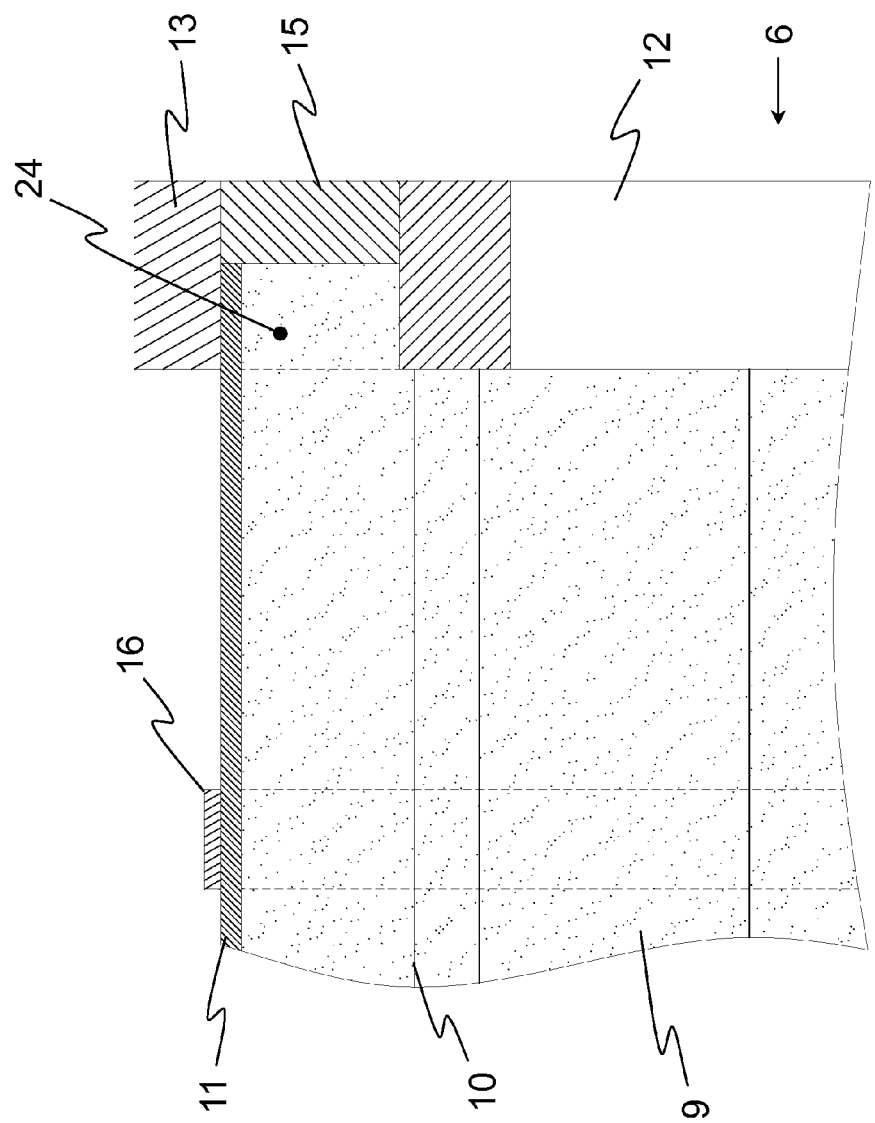

FIG. 5 shows a section in the area of a front side 5 of a possible embodiment of a sieve drum 4 according to the invention (in which case the sieve drum 4 can also be designed in the area of its second front side basically according to FIG. 5); possibly available additional sections (such as a support ring provided on the front side through which the sieve drum 4 can be connected with the drive arm 22 shown in FIG. 1, for example) are not shown owing to reasons of clarity, but can be there); likewise, the sieve drum 4 shown in FIGS. 3 to 5 can naturally be mounted in the installation shown there instead of in the sieve drum 4 shown in FIG. 1).

As can now be seen in FIG. 5, a support ring 12, a clamping ring 13 and a crosspiece 15 connecting the mentioned sections can also be provided in the area of one or both front sides 5 (in addition to the area shown in FIG. 3), so that the sieve wall 9 can also be fixed in the area of the front sides 5 only by clamping in the ring groove 24 shown.

Incidentally, the respective support rings 12 are preferably joined to one another with the help of connecting rods running parallel to the rotating axis 3, for example, so that in this case the support structure consists essentially of the connecting rods, the support rings 12, the clamping rings 13 and the crosspieces 15.

Finally, FIG. 5 shows exemplarily that—apart from the support and clamping rings 13—additional tension rings 16 (e.g. in form of metal bands running in circumferential direction of the sieve drum 4) can be provided, abutted on the sieve wall elevations 11 and contributing additionally to the stability of the sieve drum 4.

The present invention is not restricted to the embodiments shown and described. Modifications within the framework of the patent claims are just as possible as any combination of the characteristics described, even if they are shown and described in different parts of the description or the claims or in different embodiments.

LIST OF REFERENCE SIGNS

1 Sewage
2 Drive
3 Rotating axis
4 Sieve drum
5 Front side
6 Opening
7 Discharge mechanism
8 Feeding area
9 Sieve wall
10 Sieve wall depression
11 Sieve wall elevation
12 Support ring
13 Clamping ring
14 Individual element
15 Crosspiece
16 Tension ring
17 Discharge
18 Container
19 Spray nozzle bar
20 Sewer
21 Carrier bar
22 Driving arm
23 Support ring
24 Ring groove
S Direction of flow of the sewage

The invention claimed is:
1. A sieve drum for an installation to remove material to be sieved from a liquid, comprising:

a front side opening through which liquid to be sieved enters the sieve drum;

a circumferentially extending sieve wall folded into a configuration having alternating elevations and depressions, the sieve wall comprising sieve openings defined therethrough and opposite outer axial edges;

a support structure that fixes the sieve wall in the sieve drum, the support structure comprising:

a support ring disposed radially inward of the sieve wall at one or both of the outer axial edges to provide radially inboard structural support to the sieve wall depressions in a circumferential direction around the sieve wall;

a clamping ring disposed radially outward of the sieve wall opposite the support ring to provide radially outboard structural support to the sieve wall elevations in a circumferential direction of the sieve wall;

a circumferentially extending crosspiece disposed between the support ring and the clamping ring, wherein the crosspiece, the support ring, and the clamping ring define a ring groove;

the axial edge of the sieve wall fitted into the ring groove against the crosspiece; and the clamping ring separate from the support ring and crosspiece and attached at an interface with the crosspiece, the clamping ring pre-stressed such that a radial clamping force of the clamping ring clamps the sieve wall in the ring groove between the clamping ring and the support ring.

2. The sieve drum as in claim 1, wherein the clamping ring is pre-stressed to a degree such that the elevations and depression of the sieve wall fitted into the ring groove are deformed by radial compression as compared to the elevations and depressions outside of the ring groove.

3. The sieve drum as in claim 1, wherein the interface between the support ring and the clamping ring is a welded interface.

4. The sieve drum as in claim 1, wherein the support structure is configured at each of the axial edges, and further comprising an additional one of the support structures at an intermediate axial location between the axial edges.

5. The sieve drum as in claim 1, wherein the sieve wall is folded in one of a zig-zag, wavy, or cascading fashion, so that the sieve wall depressions alternate with the sieve wall elevations.

6. The sieve drum as in claim 5, wherein the sieve wall depressions and the sieve wall elevations run in an axial direction between the axial edges.

7. The sieve drum as in claim 6, wherein the sieve wall depressions and the sieve wall elevations are parallel to a rotating axis of the sieve drum.

8. The sieve drum as in claim 1, wherein the sieve wall comprises a plurality of individual sieve elements adjacent each other in the axial direction of the sieve drum, the adjacent sieve elements separated by a respective one of the support elements.

9. The sieve drum as in claim 8, wherein the individual sieve elements comprise a continuously formed sieve element ring.

10. The sieve drum as in claim 8, wherein the individual sieve elements comprise a plurality of circumferentially arranged and attached segments.

11. The sieve drum as in claim 1, further comprising a plurality of tension rings that circumferentially surround the sieve wall, the tension rings spaced apart between the axial edges of the sieve wall.

12. An installation to sieve material from a liquid, comprising:

a sieve drum that is at least partially immiscible in the liquid, the sieve drum comprising at opening at a front side thereof through which the liquid carrying the material to be sieved enters the sieve drum;

a drive connected to the sieve drum that rotates the sieve drum around a rotating axis;

a discharge mechanism arranged at least partially inside the sieve drum that removes sieved material from the sieve drum;

wherein the sieve drum is configured as the sieve drum of claim 1.

* * * * *